United States Patent [19]
Choi

[11] Patent Number: 6,028,825
[45] Date of Patent: Feb. 22, 2000

[54] APPARATUS FOR AUTOMATICALLY CONTROLLING FOCUS AND METHOD THEREOF IN A DISC PLAYER

[75] Inventor: Young-Do Choi, Seoul, Rep. of Korea

[73] Assignee: LG Electronics Inc., Seoul, Rep. of Korea

[21] Appl. No.: 08/927,016

[22] Filed: Sep. 10, 1997

[30] Foreign Application Priority Data

Sep. 19, 1996 [KR] Rep. of Korea ............. 96-40853

[51] Int. Cl.[7] ............................................. G11B 7/09
[52] U.S. Cl. ........................... 369/44.29; 369/44.25; 369/44.32; 369/44.35
[58] Field of Search ................ 369/44.25, 44.27, 369/44.29, 44.35, 54, 44.32, 47

[56] References Cited

U.S. PATENT DOCUMENTS

| | | |
|---|---|---|
| 4,497,047 | 1/1985 | Fujiie et al. . |
| 4,543,650 | 9/1985 | Wachi . |
| 4,703,468 | 10/1987 | Baba et al. . |
| 4,747,089 | 5/1988 | Eguchi et al. . |
| 4,918,680 | 4/1990 | Miyasaka et al. . |
| 4,924,455 | 5/1990 | Fujiie et al. . |
| 4,955,010 | 9/1990 | Nabeshima et al. . |
| 4,992,652 | 2/1991 | Okada . |
| 5,060,215 | 10/1991 | Kawamura et al. ............ 369/44.29 |
| 5,202,871 | 4/1993 | Yokota ............................ 369/44.29 |
| 5,379,282 | 1/1995 | Wachi ............................. 369/44.75 |
| 5,610,886 | 3/1997 | Hayashi et al. ................. 369/44.35 |
| 5,642,340 | 6/1997 | Nomura ......................... 369/44.25 |
| 5,663,942 | 9/1997 | Ishibashi et al. ............... 369/44.36 |
| 5,748,584 | 5/1998 | Maezawa ....................... 369/44.35 |

*Primary Examiner*—Thang V. Tran
*Attorney, Agent, or Firm*—Finnegan, Henderson, Farabow, Garrett & Dunner, L.L.P.

[57] ABSTRACT

An apparatus and method for automatically controlling the focusing of a CDP (compact disc player) performs more reliable automatic control operation upon abnormal conditions of a disc such as a scratch and dust. The automatic focus controlling apparatus includes a pickup assembly for reading recorded data from a disc; an RF signal converter for converting the output signal read by the pickup assembly into an RF signal; a signal separator for separating a signal corresponding to a 3T component from the RF signal; a phase comparator for comparing the separated 3T signal with a predetermined frequency to provide a phase difference value; and a controller for controlling a focusing operation of an objective lens based on the phase difference value to provide a focus control signal.

6 Claims, 6 Drawing Sheets

APPARATUS FOR AUTOMATICALLY CONTROLLING FOCUS AND METHOD THEREOF IN A DISC PLAYER

BACKGROUND OF THE INVENTION

A. Field of the Invention

The present invention relates to an automatic focus control in a disc player, and more particularly to an automatic focus controlling apparatus and method of a disc player for performing a reliable automatic controlling operation with respect to an abnormal condition of a disc such as a scratch or dust.

B. Description of the Prior Art

FIG. 1 is a functional block diagram showing a generally conventional compact disc player. Referring to FIG. 1, a pickup assembly 2 reads out data from a disc 1 to provide an electric signal. An RF signal generator 3 receives the electric signal supplied from pickup assembly 2 to produce an RF signal. The RF signal from RF signal generator 3 is amplified by a predetermined level in an RF amplifier 4, and is waveform-shaped in an analog waveform shaping part 5. Thereafter, the signal from analog waveform shaping part 5 is supplied to a digital signal processor 6 to be subjected to demodulating and decoding processing, thereby reproducing information recorded on disc 1.

Meanwhile, the output signal from pickup assembly 2 is provided to a focus error detector 7 and a track error detector 8. Focus error detector 7 detects a focus error signal FE from the signal supplied from pickup assembly 2 to provide the detected focus error signal to a servo controller 9. Track error detector 8 detects a track error signal TE from the signal supplied from pickup assembly 2 to provide the detected track error signal to servo controller 9.

Then, servo controller 9 receives focus error signal FE and track error signal TE respectively from focus error detector 7 and track error detector 8 to provide a focus control signal FC and a track control signal TC. A motor driver 10 receives focus control signal FC and track control signal TC to drive a slide motor 11, thereby transferring pickup assembly 2 up and down and side to side. Also, servo controller 9 controls a spindle motor 12 via motor driver 10 to rotate disc 1 at a predetermined speed.

FIG. 2 is a view showing a construction of the pickup assembly of FIG. 1. As shown in FIG. 2, pickup assembly 2 has a laser diode 21 for radiating laser beam, and a collimator lens 22 for converting the diverging beam into parallel rays. In addition, a beam splitter 23 separates incident light and reflected light, and a quarter-wave plate 24 changes a polarized plane of the reflected light by 90°. An objective lens 25 focuses the light, and a photodetector 26 converts the light from beam splitter 23 into an electric signal. Further, a focusing coil and a tracking coil (not shown) are disposed around objective lens 25. Current flowing through the focus coil applies a force in conformity with the Fleming's left hand law, and objective lens 25 attached to the coil is moved up and down to perform the focusing. Also, by current flowing through the track coil, objective lens 25 is moved side to side to perform the tracking.

To begin with, the laser beam produced from laser diode 21 is transformed into the parallel rays from the diverging beam by passing through collimator lens 22. At this time, a beam-splitting diffraction grating (not shown) is interposed between laser diode 21 and collimator lens 22. When the laser beam generated from laser diode 21 passes through the diffraction grating, three beams consisting of one main spot and two side spots are produced.

After this, the parallel rays from collimator lens 22 are focused onto objective lens 25 via beam splitter 23 and quarter-wave plate 24. Successively, objective lens 25 generates the beam spot to emit it to disc 1. The beam spot emitted from objective lens 25 is reflected from disc 1 to return to objective lens 25, and the reflected beam is to be changed into parallel rays via objective lens 25. The parallel rays pass through quarter-wave plate 24 to advance toward beam splitter 23. Then, beam splitter 23 shifts the advancing direction of the parallel rays by as much as 90° to permit the parallel rays to proceed toward photodetector 26.

FIG. 3 is a block diagram for illustrating a general principle of generating the RF signal, focus error signal FE and track error signal TE. Photodetector 26 includes four light-receiving devices A, B, C and D for receiving the main spot and two light-receiving devices E and F for receiving the side spots. Four light-receiving devices A, B, C and D convert the received light into electric signals and supply them to RF signal generator 3 and focus error detector 7. RF signal generator 3 sums the signals from light-receiving devices A, B, C and D to provide a sum signal A+B+C+D. The sum signal is used as the RF signal. The signals from light-receiving devices A, B, C and D are also provided as a difference signal (A+C)–(B+D) via focus error detector 7. The difference signal is used as focus error signal FE.

Light-receiving devices E and F receive the side spots to convert them into the electric signals. The signals from light-receiving devices E and F produce a difference signal E-F via track error detector 8. The difference signal E-F is used as track error signal TE.

Thereafter, servo controller 9 receives focus error signal FE and track error signal TE to produce focus control signal FC and track control signal TC.

FIG. 4 is a block diagram for illustrating a conventional focus controlling method. As is illustrated, servo controller 9 receives focus error signal FE to generate focus control signal FC.

At this time, in order to provide accurate focus control signal FC, a variable resistor VR is manually regulated by a user to adjust a focus offset to generate focus control signal FC.

Furthermore, since the specific disc is adjusted only once in its fabricating line, the conventional method has the disadvantage of being incapable of obtaining the accurate focus offset value associated with the kind or state of the disc.

SUMMARY OF THE INVENTION

The present invention is devised to solve the foregoing disadvantages of the prior art. Therefore, it is an object of the present invention to provide an automatic controlling apparatus of a focus offset for performing a more reliable automatic controlling operation with respect to abnormal conditions of a disc such as a scratch and dust.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the above object of the present invention, according to one aspect of the present invention, an automatic focus controlling apparatus, as broadly defined and embodied herein, includes a pickup assembly for reading out recorded data from a disc, and an RF signal converter for converting the output signal read by the pickup assembly into an RF signal. A signal separator separates a signal corresponding to a 3T component from the RF signal, and a phase comparator compares the separated 3T signal with a predetermined frequency to provide a phase difference value. In addition, a controller controls a focusing operation of an objective lens based on the phase difference value to provide a focus control signal.

According to another aspect of the present invention, an automatic focus controlling apparatus, as embodied herein, includes a pickup assembly for reading out recorded data of a disc; a focus error detector for detecting a focus error signal from the output signal read by the pickup assembly; an RF signal converter for converting the output signal read by the pickup assembly into an RF signal; and a signal separator for separating a signal corresponding to a 3T component from the RF signal. Further, a phase comparator compares the separated 3T signal with a predetermined frequency to provide a phase difference value; a level detector detects the signal level of the focus error signal; and a controller controls a focusing operation based on the detected signal level of the focus error signal and phase difference value to provide a focus control signal.

According to yet another aspect of the present invention, an automatic focus controlling method of a disc player, as broadly defined and embodied herein, includes controlling a focusing operation based on focus initiating data during a focusing initial operation or reset operation; and separating a 3T signal from an RF signal associated with the focus initiating data. Further, the method includes comparing the separated 3T signal with a reference signal having a predetermined frequency to detect a phase difference value, and repeating the focusing operation control step until the detected phase difference value fall within a prescribed range, are executed.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

Reference will now be made in detail to the present preferred embodiment of the invention, an example of which is illustrated in the accompanying drawings. Wherever possible, the same reference numbers will be used throughout the drawings to refer to the same or like parts.

The above objects and other advantages of the present invention will become more apparent by describing in detail preferred embodiments thereof with reference to the attached drawings in which.

DETAILED DESCRIPTION OF THE PREFERRED EMBODIMENT

An automatic focus controlling apparatus according to the present invention will be described in detail with reference to the accompanying drawings.

Figure 1:
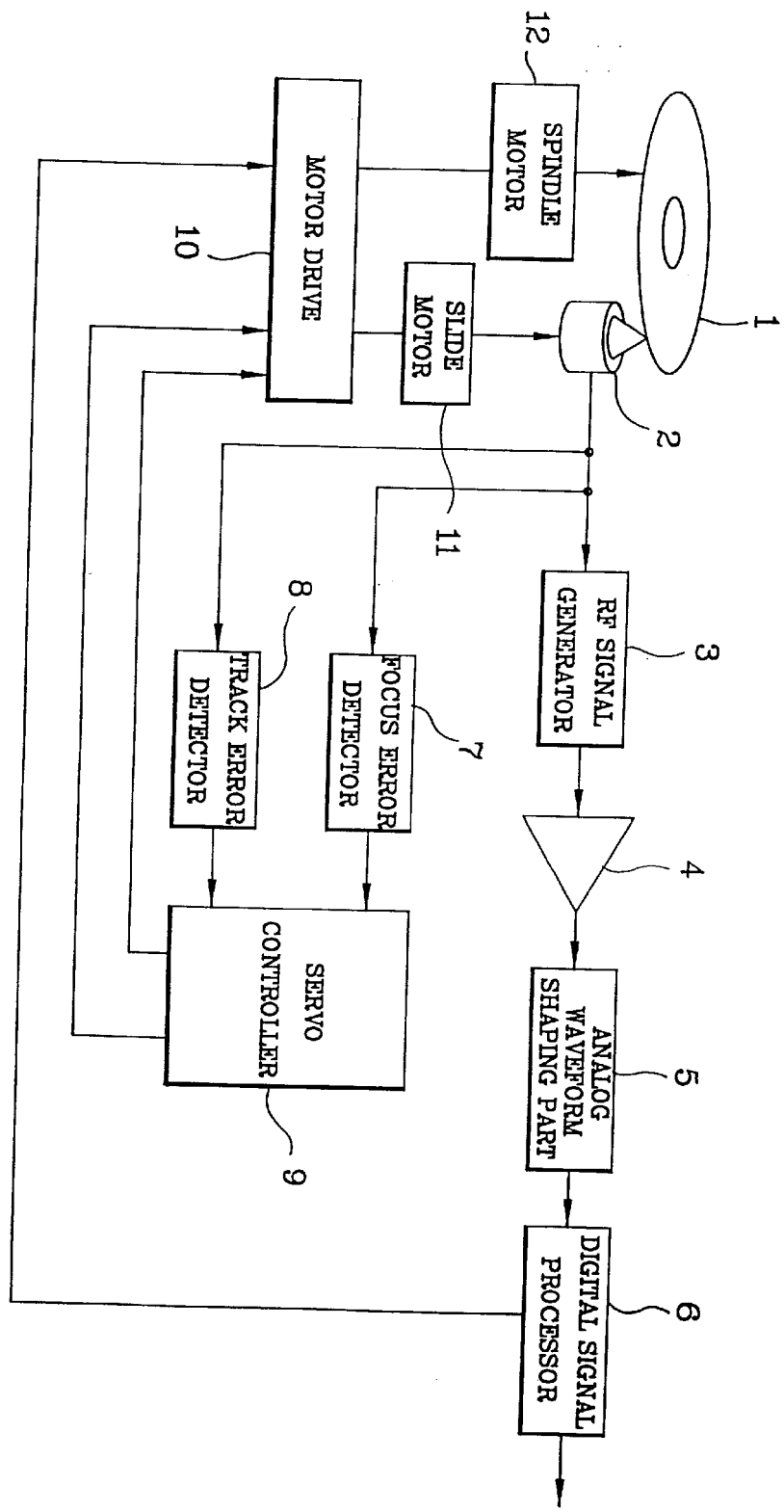
FIG. 1 is a functional block diagram showing a generally conventional compact disc player.
Figure 2:
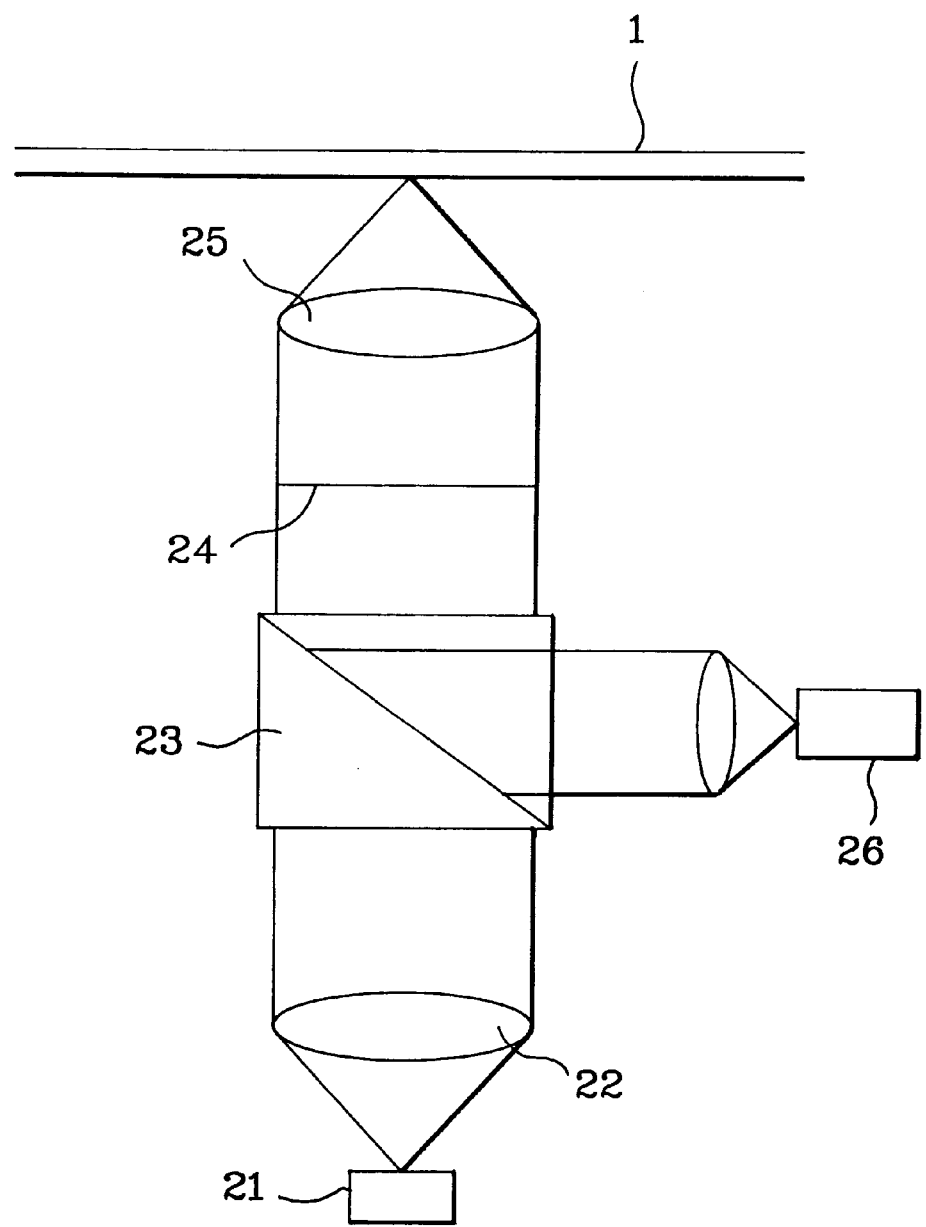
FIG. 2 is a view showing a construction of the pickup assembly of FIG. 1.
Figure 3:
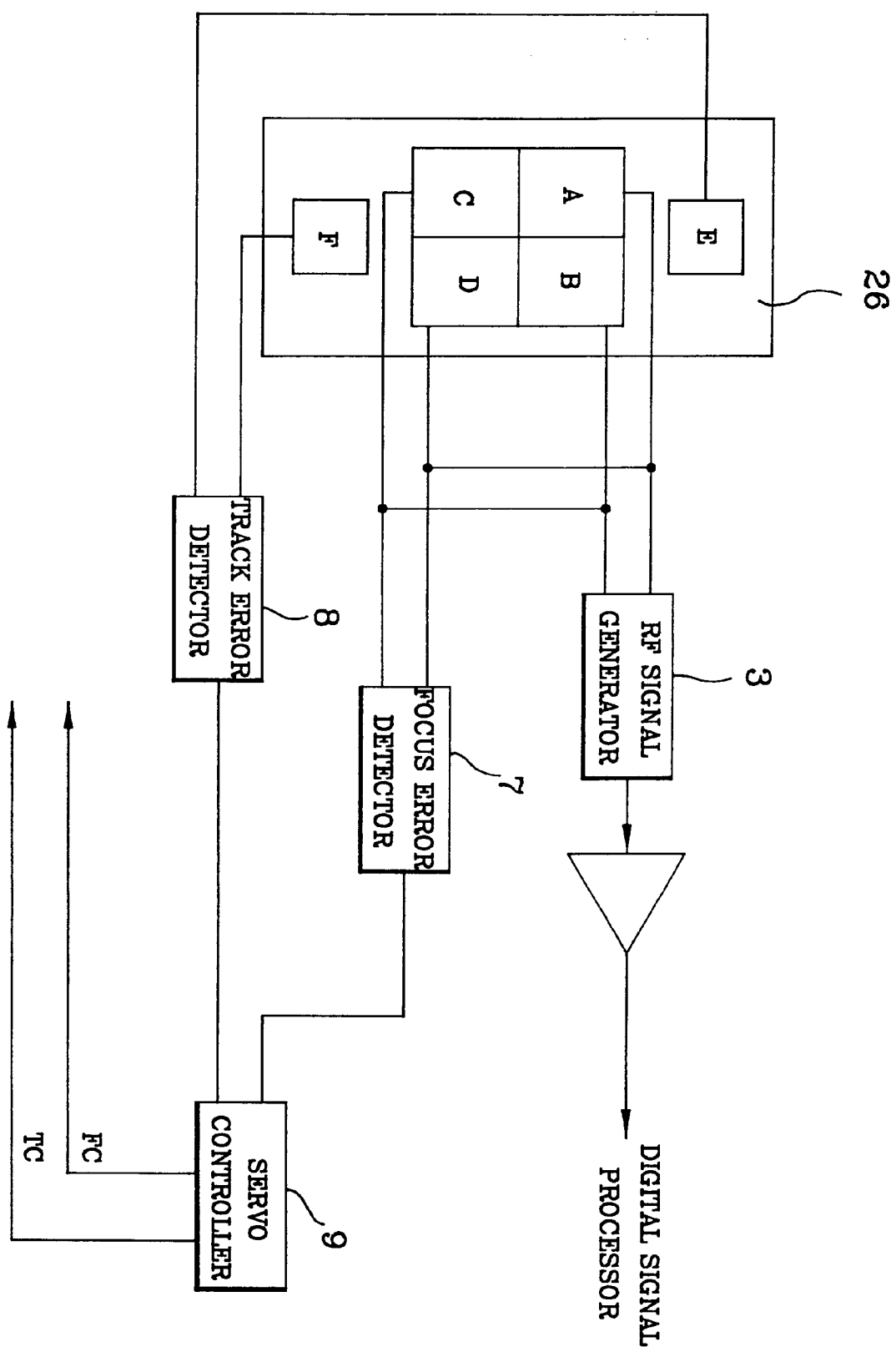
FIG. 3 is a block diagram for illustrating a general principle of producing a focus error signal and a track error signal.
Figure 4:
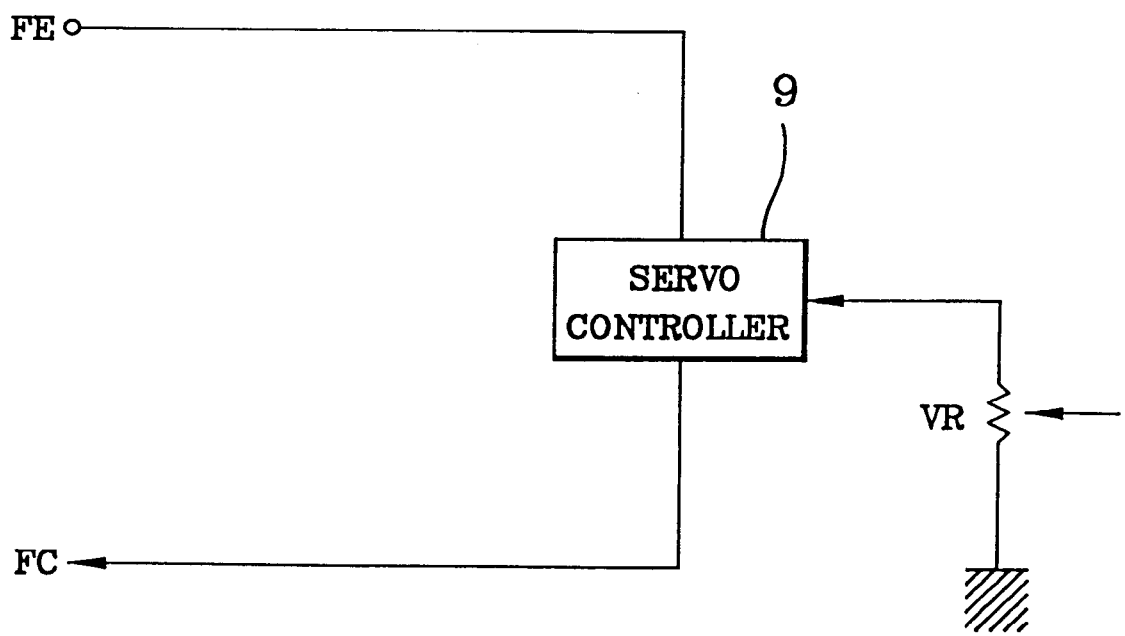
FIG. 4 is a block diagram for illustrating a conventional focus controlling method.
Figure 5:
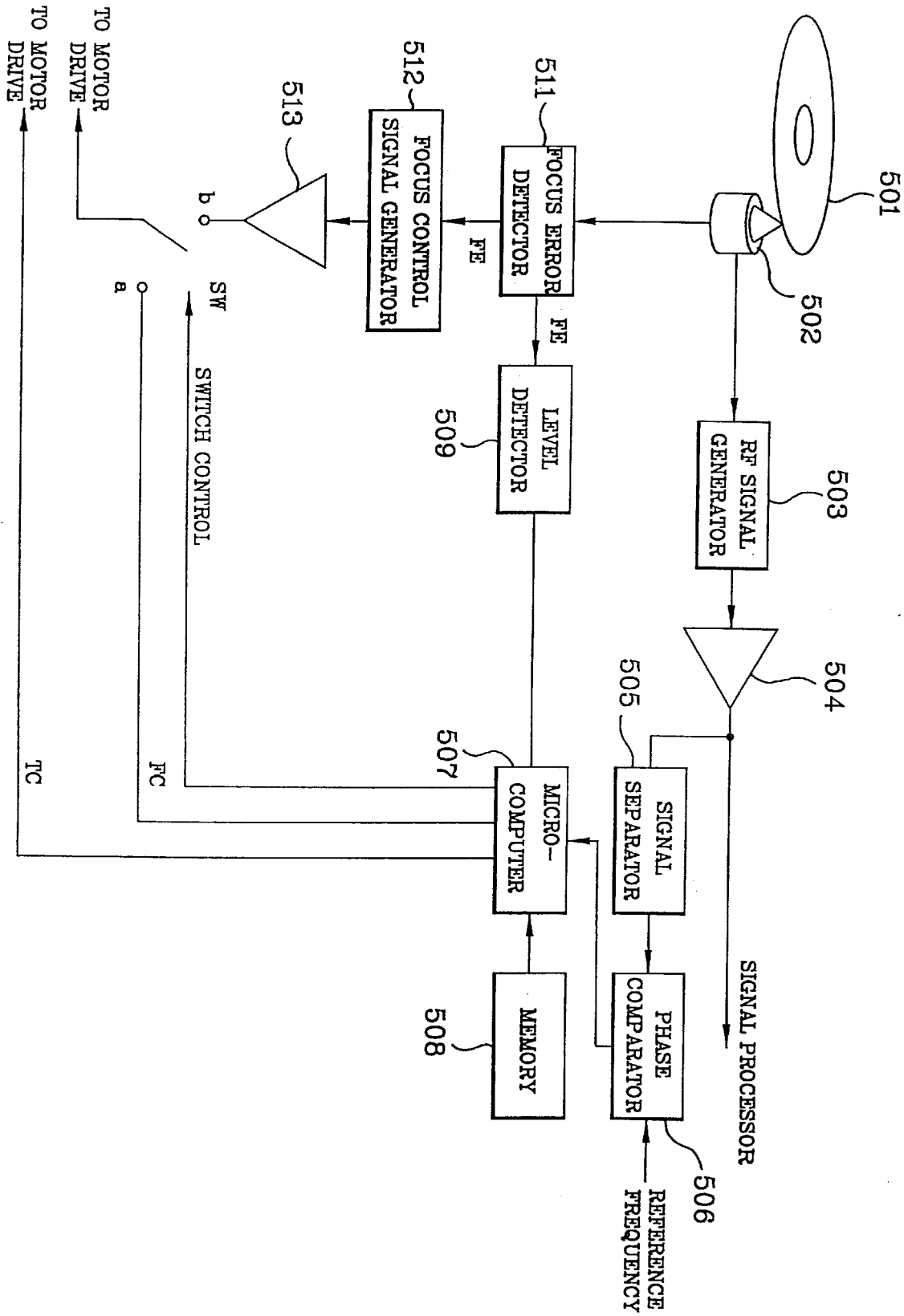
FIG. 5 is a block diagram showing an automatic focus controlling apparatus according to an embodiment of the present invention.

FIG. 5 is a block diagram showing the automatic focus controlling apparatus according to the present invention. As shown in FIG. 5, a pickup assembly 502 reads out data from a disc 501 to provide an electric signal. An RF signal generator 503 receives the electric signal supplied from pickup assembly 502 to produce an RF signal. The RF signal from RF signal generator 503 is amplified via an RF amplifier 504 to advance toward a signal processor. Also, the signal from RF amplifier 504 is provided into a signal separator 505 which in turn separates only a 3T signal in the RF signal so as to measure the jitter. For reference, a recording unit of the disc is pit, and one pit is 3T to 11T or so. Here, 3T becomes 744 mm since 1T is 258 mm.

The signal from signal separator 505 is supplied into a phase comparator 506 which then compares the signal from signal separator 505 with a reference voltage to provide an error signal fo. Thereafter, error signal fo from phase comparator 506 is provided to a microcomputer 507. In turn, microcomputer 507 receives error signal fo from phase comparator 506, focusing initial data fi stored in a memory 508 and a signal from a level detector 509 to provide a focus control signal FC and a track control signal TC. At this time, focusing initial data fi is a current or voltage value, which is stored in memory 508 at the initial stage, and applied to a focusing coil (not shown),.

Meanwhile, the electric signal from pickup assembly 502 is supplied into a focus error detector 511. After receiving the electric signal from pickup assembly 502, focus error detector 511 provides a focus error signal FE to a focus control signal generator 512 and level detector 509.

Focus control signal generator 512 receives focus error signal FE to generate focus control signal FC. At this time, focus control signal FC from focus control signal generator 512 is supplied into an amplifier 513 to be amplified by a predetermined level. Amplifier 513 is connected with a switch SW.

Additionally, level detector 509 detects the level of focus error signal FE, and provides its output signal to microcomputer 507.

Figure 6:
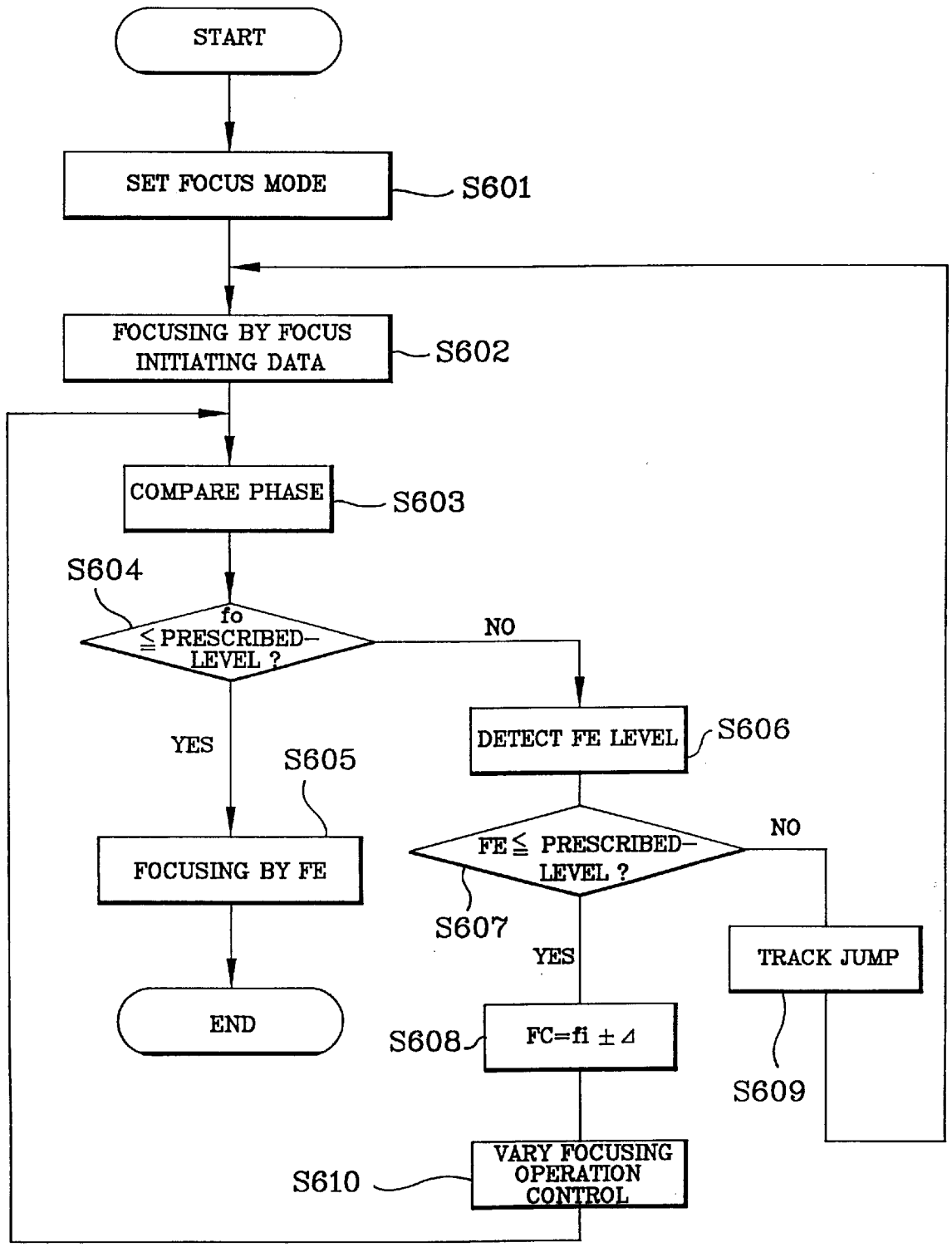
FIG. 6 is a flowchart for explaining an automatic focus controlling method according to the embodiment of the present invention.

FIG. 6 is a flowchart for explaining an automatic focus controlling method according to the present invention. As illustrated, in step S601, microcomputer 507 sets a focus mode, e.g., focusing initial mode or reset mode.

In step S602, microcomputer 507 provides an instruction for placing switch SW to a port a, and supplies focus initiating data fi stored in memory 508 as focus control signal FC.

Consequently, pickup assembly 502 is moved upward or downward, and the RF signal from pickup assembly 502 is changed. The changed RF signal generates new error signal fo via signal separator 505 and phase comparator 506, and output error signal fo is supplied into microcomputer 507.

In step S603, microcomputer 507 controls phase comparator 506 to compare the input 3T signal with reference voltage Vref, thereby producing error signal fo. Then, microcomputer 507 determines, in step S604, whether error signal fo is lower than a prescribed level or not.

The program proceeds to step S605 when error signal fo is lower than the prescribed level. If not, the program proceeds to step S606.

In step S606, microcomputer 507 determines that the focusing is accurately performed to place switch SW onto a port b. Therefore, the focusing is performed by focus error signal FE, and the program is finished.

Additionally, microcomputer 507 controls level detector 509 to detect the level of focus error signal FE in step S606.

In step S607, microcomputer 507 receives the signal supplied from level detector 509 to determine whether the signal has a level below a prescribed value or not. If it is determined that the signal is below the prescribed level, microcomputer 507 proceeds to step S608. Otherwise, it proceeds to step S609.

In step S608, microcomputer 507 adds a predetermined value ±Δ to focus initiating data fi, and the obtained value fi ±Δ is provided as focus control signal FC. Then, in step S610, the microcomputer 507 varies the focusing operation control. Then, the microcomputer 507 proceeds to step S602 to repeat the above-described steps.

Meanwhile, if it is determined that focus error signal FE exceeds the prescribed level, microcomputer 507 determines that the focusing is impossible and jumps the track in step S609. Then, by proceeding to step S602, the foregoing steps are repeated.

As described above, the automatic focus controlling apparatus and method according to the present invention is effective in that the focus is automatically controlled to eliminate the error liable to be incurred during the manual controlling. At the same time, the focus is automatically controlled to be stable with respect to warping of the disc and a mechanical error of the pickup in the disc player. Furthermore, the pickup signal obtained when the disc is in an abnormal condition due to the dust or scratch is distinguishable to be advantageous for enhancing reliability of the focus controlling operation.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. In a disc player including an optical pickup to read out recorded data of a disc, a focus error detector to detect a focus error signal from an output signal read out by said optical pickup and a focus servo unit to control the optical pickup in response to said focus error signal, an apparatus for automatically adjusting a focus offset in a disc player comprising:

converter to convert the output signal read by said optical pickup into an RF signal;

separator to separate a specific component from said RF signal;

comparator to compare the separated specific component from said separator with a signal having a predetermined frequency to provide a phase difference value;

level detector to detect a level of said focus error signal; and control unit to adjust the focus offset based on said phase difference value and focus error level, wherein the control unit controls the optical pickup to move to another point of the disc when an abnormal condition is detected, and then to perform the operation for adjusting the focus offset in the point.

2. The apparatus for automatically adjusting a focus offset in a disc player as in claim 1, further comprising storing unit to store an initial focusing offset data value, said initial focusing offset data value being applied to the motor drive from the control unit for adjusting the focus offset.

3. The apparatus for automatically adjusting a focus offset in a disc player as in claim 1, wherein when the output of said level detector or the output of said comparator is above a prescribed level, the abnormal condition is determined.

4. A method for automatically adjusting a focus offset operation in a disc player comprising:

outputting an initial focus offset data stored in a memory during a focusing initial operation or reset operation;

separating a specific component signal from an RF signal read out from the optical pickup in response to said initial focus offset data;

comparing said separated specific component signal with a reference signal having a predetermined frequency to provide a phase difference value; and varying the initial focus offset data to allow said phase difference to have a value within a prescribed range, detecting an optimum focus offset value within the prescribed range, and providing the optimum focus offset value for controlling the focusing operation.

5. The method for automatically adjusting a focus offset operation in a disc player as in claim 4, further comprising:

detecting a focus error signal and determining whether a signal level of said detected focus error signal falls within a prescribed range; and repeating from said varying step to said providing step based on the result of said detecting and determining step.

6. The method for automatically adjusting a focus offset operation in a disc player as claim 4 or 5, further comprising:

performing the operation for adjusting the focus offset in another point of the disc when the phase difference or said detected focus error signal is not within a prescribed range as a result of said comparing or determining step.

* * * * *